(12) United States Patent
Kimura

(10) Patent No.: US 12,143,551 B2
(45) Date of Patent: *Nov. 12, 2024

(54) IMAGE FORMING APPARATUS AND CONTROL METHOD

(71) Applicant: SHARP KABUSHIKI KAISHA, Osaka (JP)

(72) Inventor: Yohichi Kimura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,424

(22) Filed: Jun. 21, 2023

(65) Prior Publication Data

US 2023/0370560 A1 Nov. 16, 2023

Related U.S. Application Data

(63) Continuation of application No. 17/745,013, filed on May 16, 2022, now Pat. No. 11,722,625, which is a
(Continued)

(51) Int. Cl.
*H04N 1/32* (2006.01)
*H04N 1/00* (2006.01)

(52) U.S. Cl.
CPC ..... *H04N 1/32678* (2013.01); *H04N 1/00244* (2013.01); *H04N 1/00344* (2013.01); *H04N 1/32101* (2013.01); *H04N 2201/0094* (2013.01)

(58) Field of Classification Search
CPC .......... H04N 1/32678; H04N 1/32101; H04N 1/00244; H04N 1/00344; H04N 2201/0094
(Continued)

(56) References Cited

U.S. PATENT DOCUMENTS 10,805,486 B2 * 10/2020 Ogawa ............... H04N 1/00506
10,841,455 B2 * 11/2020 Shimotsu ........... H04N 1/32101
(Continued)

FOREIGN PATENT DOCUMENTS

JP 2010-117979 A 5/2010
JP 2015-018323 A 1/2015
(Continued)

OTHER PUBLICATIONS

Non-Final Office Action issued on Oct. 21, 2021 for U.S. Appl. No. 17/081,865.
(Continued)

*Primary Examiner* — Neil R McLean
(74) *Attorney, Agent, or Firm* — ScienBiziP, P.C.

(57) ABSTRACT

Provided is an image forming apparatus including a controller, a communicator that communicates with a management server, and an image former that forms an image. The communicator includes a first communicator and a second communicator. The controller transmits usage information of the image forming apparatus and state information of the image forming apparatus to the management server via the first communicator, and if an abnormality occurs in the first communicator, the controller transmits the usage information of the image forming apparatus or the state information of the image forming apparatus to the management server via the second communicator.

11 Claims, 14 Drawing Sheets

Related U.S. Application Data continuation of application No. 17/081,865, filed on Oct. 27, 2020, now Pat. No. 11,363,165.

(58) Field of Classification Search
USPC .......................................................... 358/1.13
See application file for complete search history.

(56) References Cited

U.S. PATENT DOCUMENTS

| | | |
|---|---|---|
| 2012/0182572 A1 | 7/2012 | Kaneko |
| 2015/0022851 A1 | 1/2015 | Kim |
| 2020/0106903 A1 | 4/2020 | Ogawa |
| 2020/0117401 A1* | 4/2020 | Shibata .............. H04N 1/00042 |

FOREIGN PATENT DOCUMENTS

| | | |
|---|---|---|
| JP | 2017-107548 A | 6/2017 |
| WO | 2017/090627 A1 | 6/2017 |

OTHER PUBLICATIONS

Notice of Allowance and Fee(s) Due issued on Feb. 14, 2022 for U.S. Appl. No. 17/081,865.
Non-Final Office Action issued on Dec. 13, 2022 for U.S. Appl. No. 17/745,013.
Notice of Allowance and Fee(s) Due issued on Mar. 22, 2023 for U.S. Appl. No. 17/745,013.

* cited by examiner

FIG. 8

| APPARATUS ID | DATE AND TIME OF OCCURRENCE | ERROR TYPE | ERROR LOG DATA |
|---|---|---|---|
| 1 | 2019/04/01 11:01:22 | PAPER JAM | ERROR 2019-04-01 11:01:22 paper jam tray1 |
| 1 | 2019/04/01 16:41:22 | SERVICE LINE ERROR | – |
| ⋮ | ⋮ | ⋮ | ⋮ |

IMAGE FORMING APPARATUS AND CONTROL METHOD

BACKGROUND OF THE INVENTION

Field of the Invention

The present invention relates to an image forming apparatus and the like. The present application is a continuation application of U.S. patent application Ser. No. 17/745,013, filed on May 16, 2022, which is a continuation application of U.S. patent application Ser. No. 17/081,865, filed on Oct. 27, 2020, the content of which is hereby incorporated by reference into this application.

DESCRIPTION OF THE BACKGROUND ART

In corporations or the like, a Multi-Function Printer (MFP) is connected to a network such as the Intranet. If a terminal device used by a user of the MFP is connected to a network to which the MFP is connected, it is possible for the user to transmit a job from the terminal device to the MFP.

A technique has been proposed for an MFP including a network board that is connected to a network different from a network such as the Intranet that is normally used by users. For example, a technique has been proposed in which a job Management Information Base (MIB) generated from information about a type and quantity of consumable components is transmitted to an external ordering system via a network different from the network normally used by the users (for example, see Japanese Unexamined Patent Application Publication No. 2010-117979).

However, the above-described technique has a problem that if a failure occurs in the network different from the network normally used by the users, information such as the information about the type and quantity of the consumable components is not transmitted to an external system.

In view of the above-described problems, an object of the present invention is to provide an image forming apparatus capable of transmitting information of the image forming apparatus via a second communicator if an abnormality occurs in a first communicator.

SUMMARY OF THE INVENTION

To resolve the above-described problems, an image forming apparatus according to the present invention includes
a controller,
a communicator that communicates with a management server, and an image former that forms an image, in which
the communicator includes a first communicator and a second communicator, and
the controller performs control to
transmit usage information of the image forming apparatus and state information of the image forming apparatus to the management server via the first communicator, and
transmit the usage information of the image forming apparatus or the state information of the image forming apparatus to the management server via the second communicator, if an abnormality occurs in the first communicator.

An image forming apparatus according to the present invention includes
a controller,
a communicator that communicates with a management server, and an image former that forms an image, in which
the communicator includes a first communicator and a second communicator, and
the controller performs control to
transmit an error content of the image forming apparatus and error log data of the image forming apparatus to the management server via the first communicator, and
transmit the error content of the image forming apparatus or the error log data of the image forming apparatus to the management server via the second communicator, if an abnormality occurs in the first communicator.

In a control method for an image forming apparatus according to the present invention, the image forming apparatus includes
a controller,
a communicator that communicates with a management server, and an image former that forms an image, in which
the communicator includes a first communicator and a second communicator, and the control method includes
transmitting usage information of the image forming apparatus and state information of the image forming apparatus to the management server via the first communicator, and
transmitting the usage information of the image forming apparatus or the state information of the image forming apparatus to the management server via the second communicator, if a failure occurs in the first communicator.

In a control method for an image forming apparatus according to the present invention, the image forming apparatus includes
a controller,
a communicator that communicates with a management server, and an image former that forms an image, in which
the communicator includes a first communicator and a second communicator, and the control method includes
transmitting an error content of the image forming apparatus and error log data of the image forming apparatus to the management server via the first communicator, and
transmitting the error content of the image forming apparatus or the error log data of the image forming apparatus to the management server via the second communicator, if an abnormality occurs in the first communicator.

The present invention enables transmission of information of an image forming apparatus via a second communicator if an abnormality occurs in a first communicator.

BRIEF DESCRIPTION OF THE DRAWINGS

FIG. 8 is a block diagram for describing a data configuration of error information according to the first embodiment;

DESCRIPTION OF THE PREFERRED EMBODIMENTS

Below, an embodiment of the present invention will be described with reference to the drawings. It is noted that in the present embodiment, as an example, a system including an image forming apparatus to which the present invention is applied will be described.

1. First Embodiment 1. 1 Overall Configuration

Figure 1:
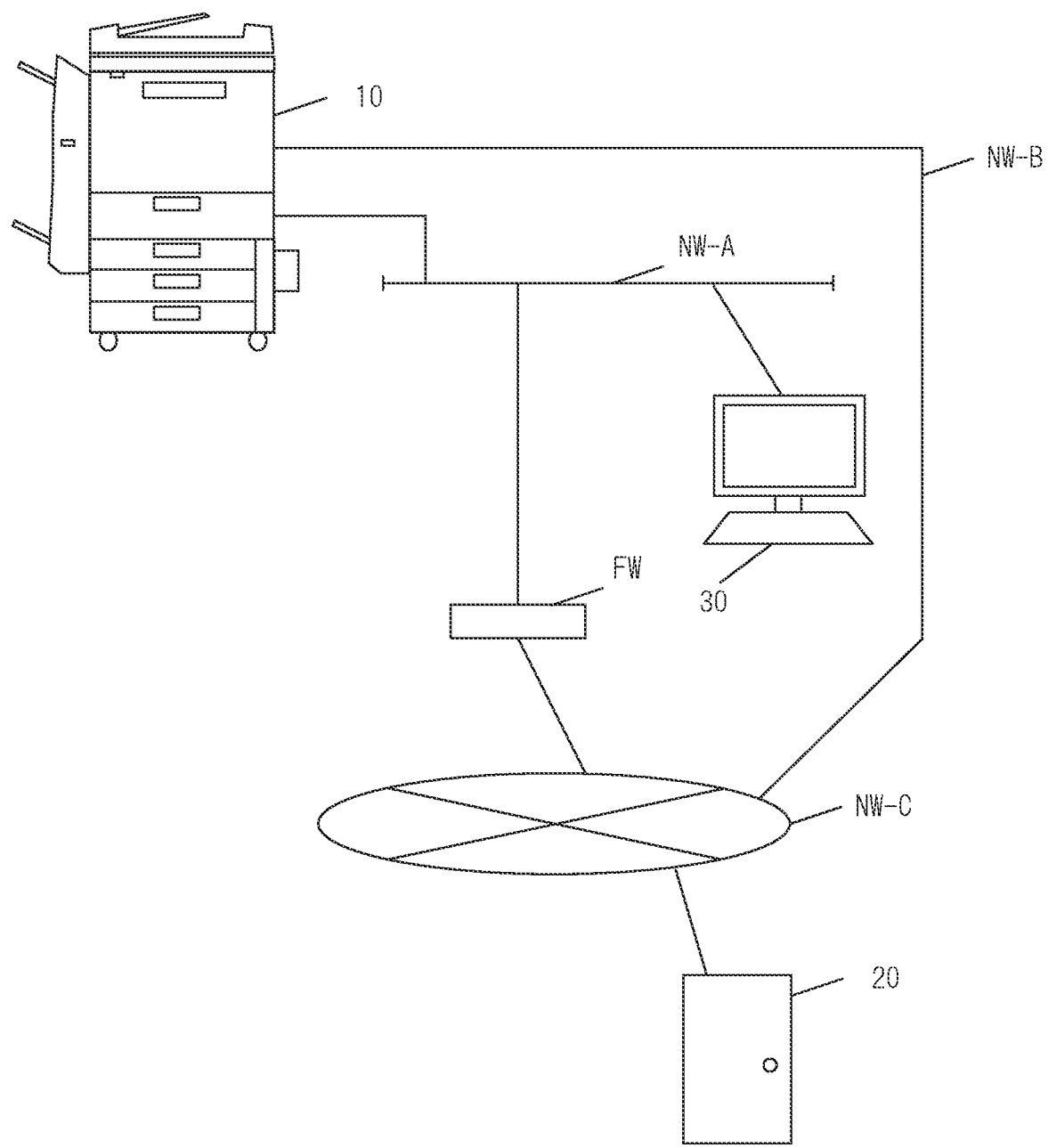
FIG. 1 is a diagram for describing an overall configuration of a system according to a first embodiment.

An overall configuration of a system 1 according to the present embodiment will be described with reference to FIG. 1. As illustrated in FIG. 1, the system 1 includes an image forming apparatus 10 and a management server 20.

The image forming apparatus 10 outputs an image by forming, on a recording sheet or the like, an image using image data input from the outside, and is a so-called Multi-Function Printer. The management server 20 is an information processing apparatus that manages a state of the image forming apparatus 10. It is noted that the system 1 may include a plurality of image forming apparatuses 10. In this case, the management server 20 manages states of the plurality of image forming apparatuses 10.

The image forming apparatus 10 is connectable to a network NW-A being a first network of a Local Area Network (LAN) (for example, the Intranet being an in-company network) and a network NW-B of a Public network (for example, a network utilizing the Long Term Evolution (LTE)/5G, or the like) as a second network. The image forming apparatus 10 is further connected to an external network NW-C being a third network such as the Internet, via the network NW-A and the network NW-B. Thus, the image forming apparatus 10 communicates with the management server 20 connected to the network NW-C.

A terminal device 30 may be connected to the network NW-A. The terminal device 30 communicates with the image forming apparatus 10 regarding data and print jobs. The network NW-A may be connected to the network NW-C via a firewall FW. The firewall FW sets communication that is connectable to the network NW-C among types of communication performed by apparatuses connected to the network NW-A.

The management server 20 provides a service related to the image forming apparatus 10. For example, the management server 20 provides the following services.

(1) Perform charging management by acquiring usage information (for example, a counter value) of the image forming apparatus 10.

(2) Demand repair or provide information for troubleshooting by acquiring state information (for example, paper jam information) of the image forming apparatus 10.

(3) Place an order of consumable items by acquiring state information (for example, a remaining toner amount) of the image forming apparatus 10.

In the present embodiment, the network NW-A is referred to as a "user shared line" and the network NW-B is referred to as a "service dedicated line."

The service dedicated line is a dedicated line for connecting to the services provided by the management server 20 described above. The user shared line is a shared line (network) used by ordinary users at a place where the image forming apparatus 10 is installed.

Generally, the user shared line is used by a user at an installation location of the image forming apparatus 10. The image forming apparatus 10 needs to periodically transmit information regarding the image forming apparatus 10 to the management server 20, and it is not preferable to use the user shared line for the following reasons.

(1) A network load of the user shared line increases. If communication of information of the image forming apparatus 10 that is originally not related to the user is performed, a problem arises in that the performance of the entire network deteriorates.

(2) The image forming apparatus 10 communicates with the management server 20, and thus, a setting of the firewall FW needs to be changed. Changing the setting of the firewall FW may not be preferable in terms of security.

(3) Procedures such as a separate contract are required. A communication content of the image forming apparatus 10 is unclear to the user, and thus, procedures may be complicated if the information is disclosed or a separate contract is concluded.

Thus, in the present embodiment, the service dedicated line is normally used to transmit the information (for example, usage information and state information) of the image forming apparatus 10 to the management server 20.

It is noted that the usage information and the state information in the present embodiment are pieces of information regarding the image forming apparatus 10.

Here, the usage information (first information) is information regarding the usage of the image forming apparatus 10, such as a usage condition of the image forming apparatus 10. In the present embodiment, the usage information is, for example, count data of the image forming apparatus 10. The count data is information indicating the number of images formed by an image former 140 described later. Information indicating the number of formed images for each type of recording sheet on which an image is formed and the number of formed images for each type of color mode (for example, monochrome or color) of the formed image may be stored in the count data.

The state information (second information) is information other than the usage information regarding the image forming apparatus 10, and is information acquirable by the image forming apparatus 10 in a current state and/or a past state or until reaching the current state. For example, the state information includes log information indicating a history of the image forming apparatus 10, a usage condition of each component such as a fixer, defect prediction data predicted from the usage condition, operation information of devices such as a current temperature of a fixing device and an operation state of a fan, a setting value of the image forming apparatus, firmware data, and the like. The defect prediction data may be detected by a sensor device 170 described later. That is, in a case where no error occurs, but the data detected by the sensor device 170 is not included in a data range regarded as normal, the data detected by the sensor device 170 may be used as the defect prediction data.

In the present embodiment, the usage information being the first information has a smaller data amount than the state information being the second information. That is, a case will be described in which the first information has a smaller data amount if the first information and the second information are compared. Needless to say, the first information and the second information may be information other than the above-described information. For example, if the first information and the second information are pieces of information related to an error, the first information is an error content such as information indicating a date and time of an error occurrence and an error type (an error code or the like), and the second information is a log indicating the error (error log data).

1. 2 Functional Configuration 1. 2. 1 Image Forming Apparatus

Figure 2:
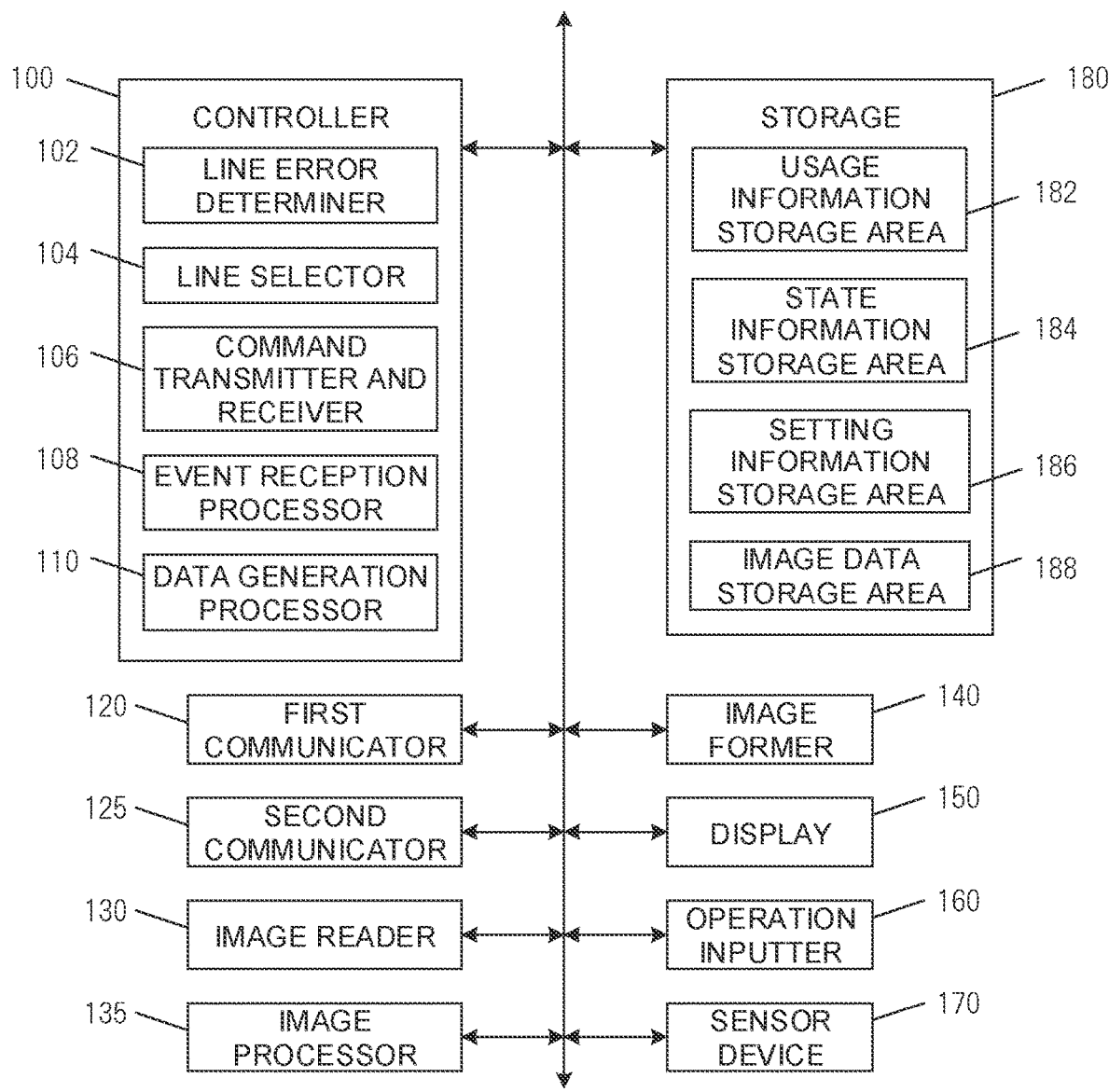
FIG. 2 is a block diagram for describing a functional configuration of an image forming apparatus according to the first embodiment.

A functional configuration of the image forming apparatus 10 in the present embodiment will be described with reference to FIG. 2. As illustrated in FIG. 2, the image forming apparatus 10 includes a controller 100, a first communicator 120, a second communicator 125, an image reader 130, an image processor 135, the image former 140, a display 150, an operation inputter 160, the sensor device 170, and a storage 180.

The controller 100 is a functional element that controls the entire image forming apparatus 10. The controller 100 includes, for example, one or a plurality of arithmetic devices (a Central Processing Unit (CPU)), and realizes various types of functions by reading and executing various types of programs.

The controller 100 reads and executes a program stored in the storage 180 to realize functions of a line error determiner 102, a line selector 104, a command transmitter and receiver 106, an event reception processor 108, and a data generation processor 110.

Figure 3:
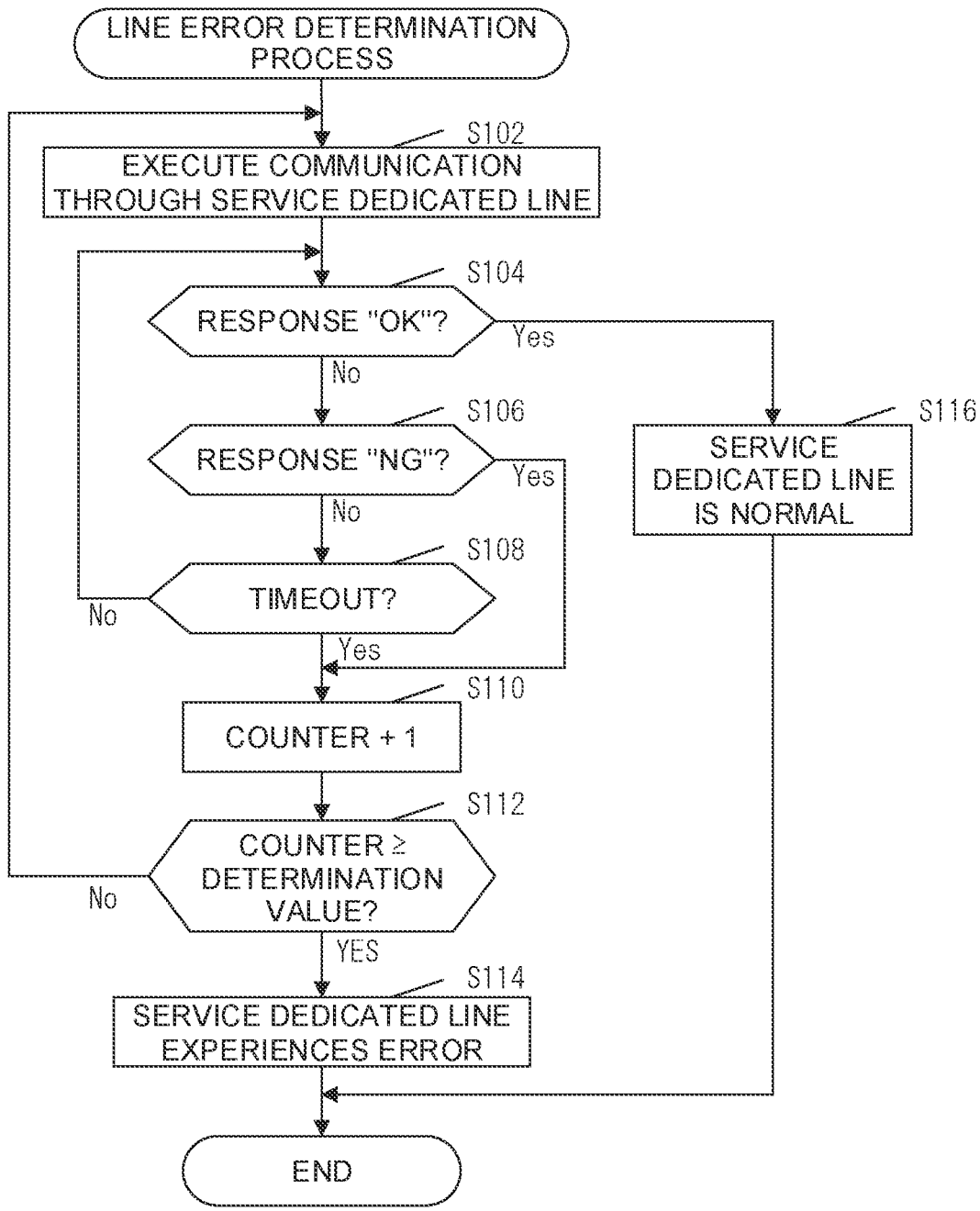
FIG. 3 is a flowchart for describing a flow of a line error determination process according to the first embodiment.

The line error determiner 102 determines whether a line state of the service dedicated line is in a normal state where communication is performed or whether the line state is in an abnormal state where communication is not performed. The line error determiner 102 executes a determination process while communication is being performed between the image forming apparatus 10 and the management server 20 through the service dedicated line, for example. An example of a line error determination process realized by the line error determiner 102 will be described with reference to FIG. 3.

The line error determiner 102 performs communication through the service dedicated line (step S102). Specifically, the command transmitter and receiver 106, which will be described later, transmits a command and data to the management server 20. Then, if "OK" is received as a response from the management server 20 (step S104; Yes), it is determined that the service dedicated line is in a normal state (communication is appropriately performed) (step S116).

For example, the image forming apparatus 10 transmits a "polling request," a "machine error alert," and "request data" to the management server 20. On the other hand, the management server 20 transmits a "polling response," a "machine error alert response," and a "request data response" to the image forming apparatus 10. Hereinafter, the "polling response," the "machine error alert response," and the "request data response" transmitted from the management server 20 to the image forming apparatus 10 are collectively referred to as a "response." The response includes either "OK" as a parameter indicating normality (in this case, the response indicates a normal state), or "NG" as a parameter indicating abnormality (in this case, the response is NG).

If NG is received as a response from the management server 20 (step S106; Yes) or if a response is not received due to a timeout (step S106; No→step S108; Yes), the line error determiner 102 adds (increments) 1 to a value of a counter (step S110).

The line error determiner 102 determines whether the value of the counter is equal to or greater than a determination value (for example, "5") (step S112). If the value of the counter is not equal to or greater than the determination value (step S112; No), communication is performed again through the service dedicated line (step S102). That is, the line error determiner 102 transmits a polling request or the like to the management server 20 via the service dedicated line (step S102).

If the value of the counter is equal to or greater than the determination value in step S112, the line error determiner 102 determines that the "polling request," the "machine error alert," and the "request data" are not transmitted within a predetermined time, and thus, the service dedicated line experiences an error (step S112; Yes→step S114).

It is noted that the line error determiner 102 may determine by another method that an error occurs in the service dedicated line (communication is not performed). For example, a response utilizing Ping may be checked or network management information may be utilized. For example, the line error determiner 102 may receive a signal indicating that communication is currently possible/impossible from a core network via the first communicator 120.

The line error determiner 102 may execute the line error determination process each time the image forming apparatus 10 performs communication utilizing the service dedicated line, or may execute the line error determination process by periodical interruption.

Figure 4:
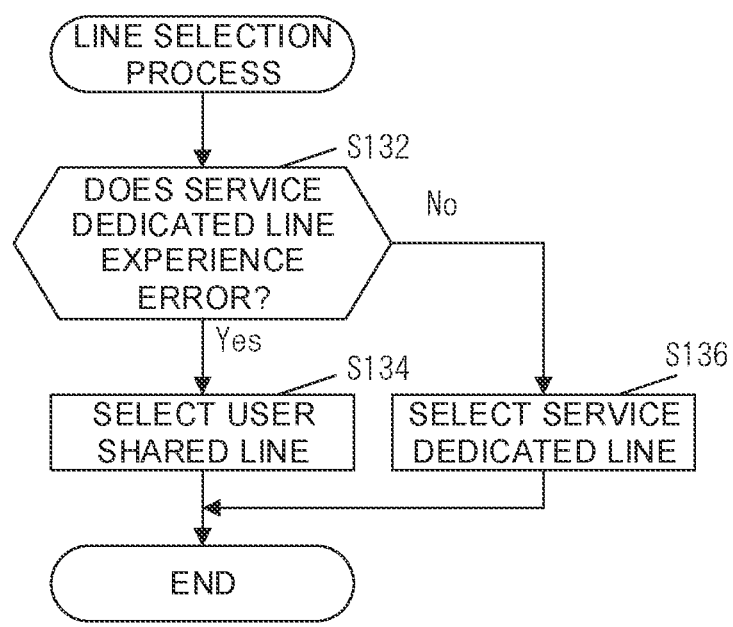
FIG. 4 is a flowchart for describing a flow of a line selection process according to the first embodiment.

The line selector 104 selects a line used when the image forming apparatus 10 communicates with the management server 20 from among a service dedicated line or a user shared line. An example of a line selection process realized by the line selector 104 will be described with reference to FIG. 4.

The line selector 104 causes the line error determiner 102 to determine whether an error occurs in the service dedicated line (step S132). Here, if an error occurs in the service dedicated line, the line selector 104 selects the user shared line as a line for transmitting and receiving data in the future (step S132; Yes→step S134).

On the other hand, if no error occurs in the service dedicated line, the line selector 104 selects the service dedicated line as a line for transmitting and receiving data in the future (step S132; No→step S136).

The line selector 104 may execute the line selection process after the line error determination process is executed by the line error determiner 102, or each time the command transmitter and receiver 106 transmits a command to the management server 20.

The command transmitter and receiver 106 transmits and receives a command that is exchanged with the management server 20. For example, the command transmitter and receiver 106 analyzes a command received from the management server 20, and transmits necessary data from a line selected by the line selector 104.

Here, the command transmitter and receiver 106 executes a transmission process and a reception process. For example, in the transmission process executed by the command transmitter and receiver 106, transmission data generated by the event reception processor 108 or the data generation processor 110 is transmitted as a command to the management server 20.

If transmitting a command, the command transmitter and receiver 106 transmits a command to the management server 20 by utilizing the line selected by the line selector 104. At this time, as will be described later, if the user shared line is selected by the line selector 104, the command transmitter and receiver 106 limits, suppresses, or compresses a type of data to be transmitted. In the present embodiment, an example will be described where the command transmitter and receiver 106 limits (selects) the type of data to be transmitted if the user shared line is selected by the line selector 104.

Figure 5:
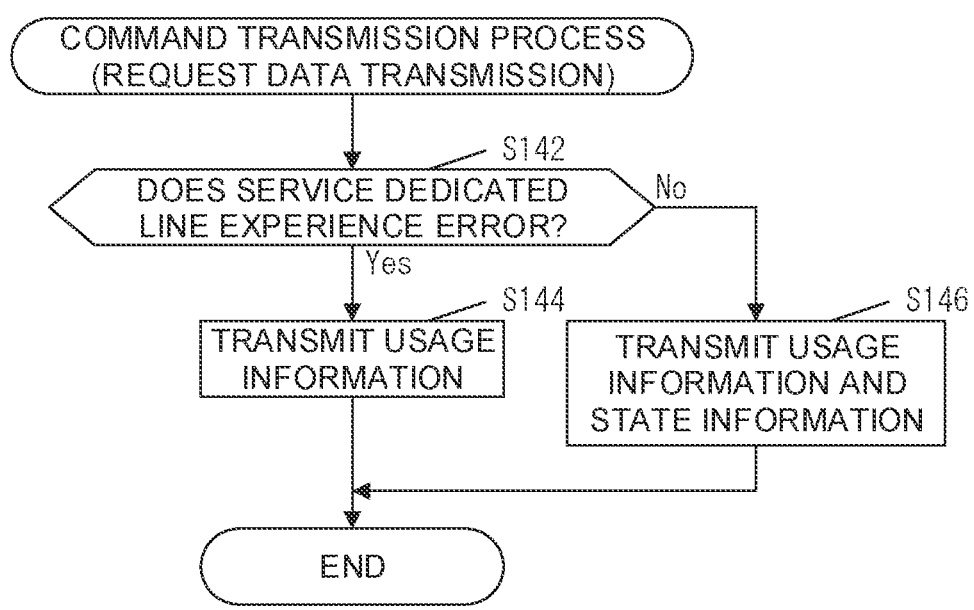
FIG. 5 is a flowchart for describing a flow of a command transmission process (request data transmission) according to the first embodiment.

FIG. 5 is a diagram for describing an example of a command transmission process for transmitting request data from among command transmission and reception processes executed by the command transmitter and receiver 106.

If the service dedicated line experiences an error, the command transmitter and receiver 106 transmits only the usage information (first information) to the management server 20 (step S142; Yes→step S144).

If the service dedicated line is in a normal state, the command transmitter and receiver 106 transmits the usage information (first information) and the state information (second information) to the management server 20 (step S142; No→step S146).

In this way, the command transmitter and receiver 106 appropriately selects necessary data according to the line state of the service dedicated line, and transmits the data to the management server 20 via an appropriate line. The command transmitter and receiver 106 transmits the selected information as a command (included in a command) to the management server 20 via the line selected by the line selector 104.

Figure 6:
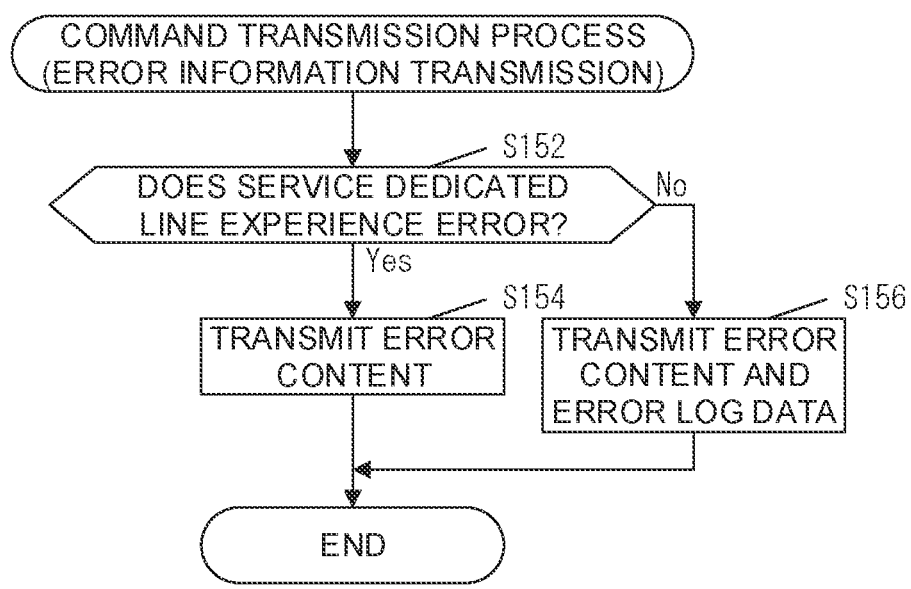
FIG. 6 is a flowchart for describing a flow of a command transmission process (error information transmission) according to the first embodiment.

FIG. 6 is a diagram for describing an example of a command transmission process for transmitting error information from among command transmission processes executed by the command transmitter and receiver 106. The first information is an error content and the second information is error log data.

If the service dedicated line experiences an error, the command transmitter and receiver 106 transmits only the error content (first information) to the management server 20 (step S152; Yes→step S154).

On the other hand, if the service dedicated line is in a normal state (if no error occurs), the command transmitter and receiver 106 transmits the error content (first information) and the error log data (second information) to the management server 20 (step S152; No→step S156).

In the reception process executed by the command transmitter and receiver 106, a command transmitted from the management server 20 is received by the command transmitter and receiver 106, for example. Then, the command transmitter and receiver 106 analyzes the command and extracts a parameter and data included in the command. The command transmitter and receiver 106 also transmits a notification to the event reception processor 108 and/or the data generation processor 110 as necessary. For example, the command transmitter and receiver 106 notifies the event reception processor 108 of an event of acquiring a setting value in the image forming apparatus 10, an event of rewriting data in the image forming apparatus 10, an event of acquiring a log in the image forming apparatus 10, and the like.

If an interruption occurs in the image forming apparatus 10, the event reception processor 108 receives the interruption as an event. For example, if an error (for example, a paper jam, a waste toner bottle replacement, or an empty toner) occurs in the image forming apparatus 10, a notification is transmitted, as an event, to each of the functional elements such as the controller 100. The event reception processor 108 transmits a notification to a functional element that processes various types of events, based on the notification received from the command transmitter and receiver 106. For example, the event reception processor 108 notifies a functional element that performs a process of acquiring a setting value in the image forming apparatus 10 of the event of acquiring the setting value in the image forming apparatus 10. In this way, the event reception processor 108 generates an event based on the command received from the server to execute a necessary process. An execution result of the event (for example, the setting value in the image forming apparatus 10) is stored in the storage 180 through processes by each of the functional elements.

The data generation processor 110 collects requested data based on the notification from the command transmitter and receiver 106 to generate a command to be transmitted to the management server 20. The data generation processor 110 may also collect data related to the event received by the event reception processor 108 to generate a command to be transmitted to the management server 20.

Here, the command and data generated by the data generation processor 110 include for example the following.

(1) Polling request
(2) Machine error alert
(3) Request data

The polling request is a command for the line error determiner 102 to determine whether a line through which the image forming apparatus 10 and the management server 20 communicate is in a normal state. The polling request may be appropriately transmitted from the image forming apparatus 10 before the communication between the image forming apparatus 10 and the management server 20, or may be periodically transmitted (for example, every one second, every five seconds, every one minute, or every 30 minutes). If receiving a polling response including a parameter "OK" from the management server 20, the line error determiner 102 determines that a communication line is in a normal state.

The machine error alert is data and a command transmitted to the management server 20 if an error occurs in the image forming apparatus 10. The machine error alert includes, as a parameter, one or a plurality of pieces of information such as a date and time of the error occurrence, a type of the error, and error log data. If the communication line is in an abnormal state, the machine error alert may also include, as a parameter, a fact that an error occurs in the communication line.

The request data is data transmitted if a data acquisition request is issued from the management server 20. The request data includes the usage information and/or the state information as data. The image forming apparatus 10 receives a polling response from the management server 20. If the polling response includes an acquisition request, the data generation processor 110 generates data included in the acquisition request. Then, the image forming apparatus 10 transmits the request data to the management server 20.

The first communicator 120 connects to the service dedicated line (network NW-B) and communicates with the management server 20. For example, the first communicator 120 includes a communication module that is connectable to the Long Term Evolution (LTE)/LTE-Advanced (LTE-A)/a License-Assisted Access (LAA) using the LTE/a 5G line.

The second communicator 125 connects to the user shared line (network NW-A) and communicates with other devices. For example, the second communicator 125 includes a wired/wireless LAN communication module that is connectable to Ethernet (registered trademark).

The image reader 130 is a functional element that reads an image of a document and generates image data. For example, the image reader 130 includes a scanner device provided with a device that converts optical information of a Charge Coupled Device (CCD), a Contact Image Sensor (CIS), or the like into an electric signal.

The image processor 135 is a functional element that performs various types of image processes and image quality adjustment of image data. For example, the image processor 135 performs a sharpening process or a color conversion process of image data.

The image former 140 is a functional element that forms image data on a storage medium (for example, a recording sheet). The image former 140 includes, for example, a laser printer or the like utilizing an electrophotographic method.

The display 150 is a functional element that displays various types of information to the user, and includes, for example, a Liquid Crystal Display (LCD), an organic Electro Luminescence (EL) display, or the like. The operation inputter 160 is a functional element that receives an operation instruction from the user, and includes various types of key switches, and a hardware key that detects a touch input or the like. The image forming apparatus 10 may include a touch panel in which the display 150 and the operation inputter 160 are integrally formed. By utilizing the touch panel, the operation inputter 160 may be realized by a software key, for example. A method of detecting an input on the touch panel may be a common detection method such as a resistive method, touch screen technology utilizing infrared or electromagnetic induction, or a capacitive method.

The sensor device 170 is a functional element that detects an operation state inside the image forming apparatus 10, and includes various types of sensors. For example, the sensor device 170 includes a speed sensor to detect a speed at which a recording sheet on which an image is formed is moved inside the image forming apparatus 10 when the controller 100 executes a print or copy job, and includes a temperature sensor to detect a temperature or the like inside the image forming apparatus 10.

The storage 180 is a functional element that stores various types of programs and various types of data necessary for an operation of the image forming apparatus 10. The storage 180 includes, for example, a Solid State Drive (SSD) being a semiconductor memory, and a Hard Disk Drive (HDD).

In the present embodiment, the storage 180 secures a usage information storage area 182, a state information storage area 184, a setting information storage area 186, and an image data storage area 188.

The usage information storage area 182 stores usage information in the image forming apparatus 10. The state information storage area 184 stores state information in the image forming apparatus 10.

The setting information storage area 186 stores information set in the image forming apparatus 10. For example, information indicating a connection destination of the management server 20 (for example, an IP address) and information such as a timing for performing a polling operation with respect to the management server 20 are stored as setting information related to communication with the server.

The polling operation is executed by the image forming apparatus 10 with respect to the management server 20. For example, any timing such as every one second, every three seconds, every one minute, or every 30 minutes is set as a timing for polling. The timing may be automatically set depending on a line condition of the network (for example, a maximum value of a communication speed usable during transmission).

The image data storage area 188 stores image data to be output by the image former 140. The image data storage area 188 stores, for example, image data of a document read by the image reader 130 and image data based on data transmitted from an external device such as the terminal device 30 via the second communicator 125.

1. 2. 2 Management Server

Figure 7:
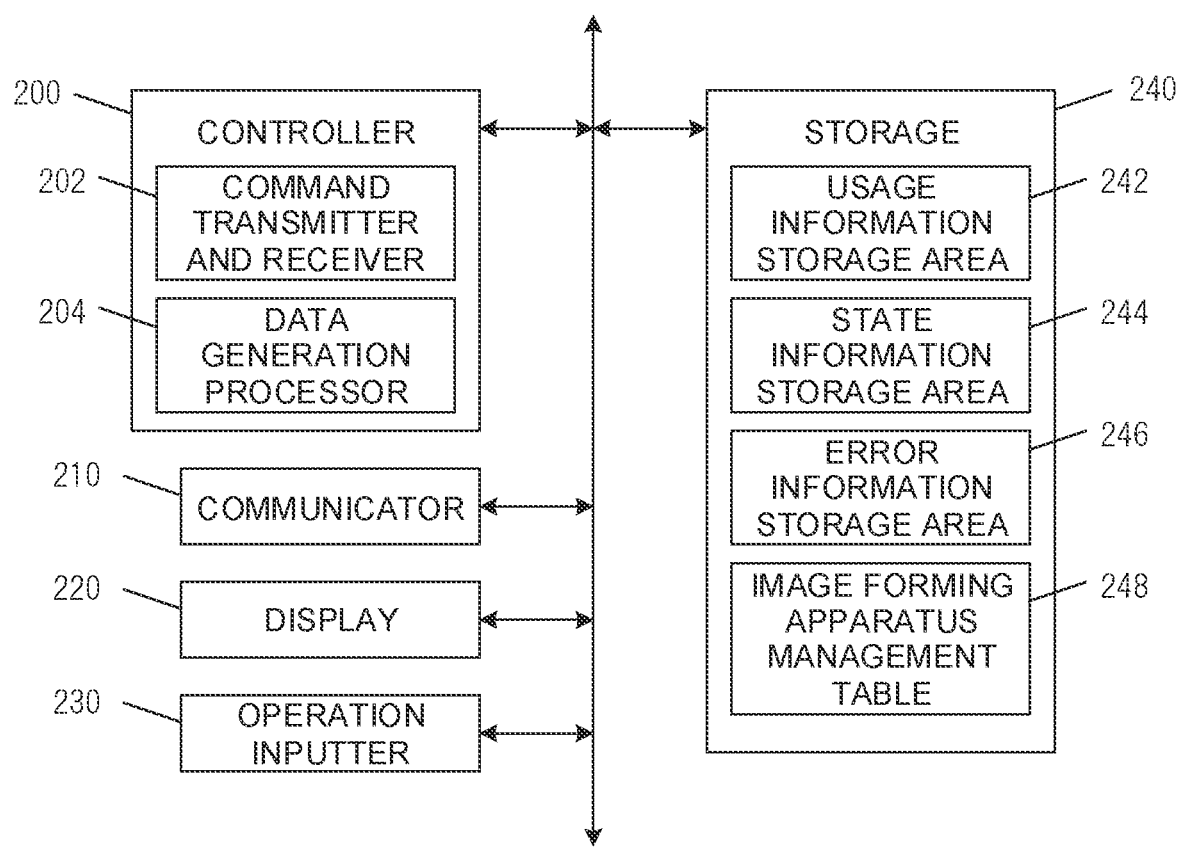
FIG. 7 is a block diagram for describing a functional configuration of a management server according to the first embodiment.

A functional configuration of the management server 20 in the present embodiment will be described with reference to FIG. 7. As illustrated in FIG. 7, the management server 20 includes a controller 200, a communicator 210, a display 220, an operation inputter 230, and a storage 240.

The controller 200 is a functional element that controls the entire management server 20. The controller 200 realizes various types of functions by reading and executing various types of programs, and includes, for example, one or a plurality of arithmetic devices (CPU).

The controller 200 realizes functions of a command transmitter and receiver 202 and a data generation processor 204 by reading and executing a program stored in the storage 240.

The command transmitter and receiver 202 transmits and receives a command that is exchanged with the image forming apparatus 10. For example, the command transmitter and receiver 202 analyzes a command received from the image forming apparatus 10 and transmits a response including a parameter to the image forming apparatus 10.

Here, the command transmitter and receiver 202 executes a transmission process and a reception process. In the transmission process executed by the command transmitter and receiver 202, transmission data generated by the data generation processor 204 is transmitted as a command to the management server 20, for example.

In the reception process executed by the command transmitter and receiver 202, a command transmitted from the image forming apparatus 10 is received by the command transmitter and receiver 202, for example. Then, the command transmitter and receiver 202 analyzes the command and extracts a parameter and data included in the command. The command transmitter and receiver 202 performs notification with respect to the data generation processor 204 as necessary.

Here, a command and data generated by the data generation processor 204 include for example the following.

(1) Polling response
(2) Machine error alert response
(3) Request data response

The polling response is a command that responds to a polling request received from the image forming apparatus 10. The data generation processor 204 may include, in the polling response, a parameter "OK" indicating that a communication state is normal or a parameter "NG" indicating that the communication state is abnormal. A parameter "acquisition request" that requests data of the image forming apparatus 10 may also be included in the polling response.

The machine error alert response is a command that responds to a machine error alert received from the image forming apparatus 10. If an error content of the alert is normally received from the image forming apparatus 10, the management server 20 transmits the machine error alert response to the image forming apparatus 10. At this time, if the error content is normally received, the data generation processor 204 may include a parameter "OK" in a parameter of the machine error alert response.

The request data response is a command that responds to a case where request data received from the image forming apparatus 10 is correctly received. The data generation processor 204 may include a parameter "OK" in the request data response.

The communicator 210 is a functional element used by the management server 20 to communicate with an external device. For example, the communicator 210 is configured as an interface that performs communication via a wireless LAN or a wired LAN.

The display 220 displays various types of information. For example, the display 220 includes a device such as an LCD or an organic EL display. The operation inputter 230 is a functional element that receives an operation input from the user, and includes, for example, an external input device such as a keyboard and a mouse.

The storage 240 is a functional element that stores various types of programs and various types of data necessary for an operation of the management server 20. The storage 240 includes, for example, an SSD being a semiconductor memory, and an HDD.

The storage 240 secures storage areas of a usage information storage area 242, a state information storage area 244, and an error information storage area 246, and stores an image forming apparatus management table 248.

The usage information storage area 242 stores usage information acquired from the image forming apparatus 10. The state information storage area 244 stores state information acquired from the image forming apparatus 10. The storage 240 may store the usage information and the state information for each image forming apparatus 10 from which the information is received. It is noted that the usage information and device information have substantially the same data configuration as the usage information and the device information stored in the image forming apparatus 10.

The error information storage area 246 stores information (error information) regarding an error acquired from the image forming apparatus 10. The error information in the present embodiment includes an apparatus ID (for example, "1") that identifies the image forming apparatus 10, the date and time of error occurrence (for example, "2019/04/01 11:01:22"), an error type (for example, "paper jam"), and error log data (for example, "ERROR 2019-04-01 11:01:22 paper jam, tray1").

The image forming apparatus management table 248 manages the image forming apparatus 10 managed by the management server 20. For example, the image forming apparatus management table 248 stores an IP address of the image forming apparatus 10, a timing of information acquisition from the image forming apparatus 10, and the like, and the controller 200 refers to the image forming apparatus management table 248 to manage the image forming apparatus 10.

1. 2. 3 Terminal Device

The terminal device 30 is an information processing apparatus such as a computer, a smartphone, or a tablet that is connected to the network NW-A. The terminal device 30 includes at least a controller, a storage, and a communicator. The terminal device 30 may also include a display, an operation processor, and the like as necessary.

The terminal device 30 transmits a print job to the image forming apparatus 10 via the network NW-A. The image forming apparatus 10 stores the print job received via the second communicator 125 in the storage 180. Then, the image forming apparatus 10 reads a print job as appropriate, executes image processing in the image processor 135, and then forms an image on, for example, a recording paper by the image former 140.

1. 3 Process Flow

Figure 9:
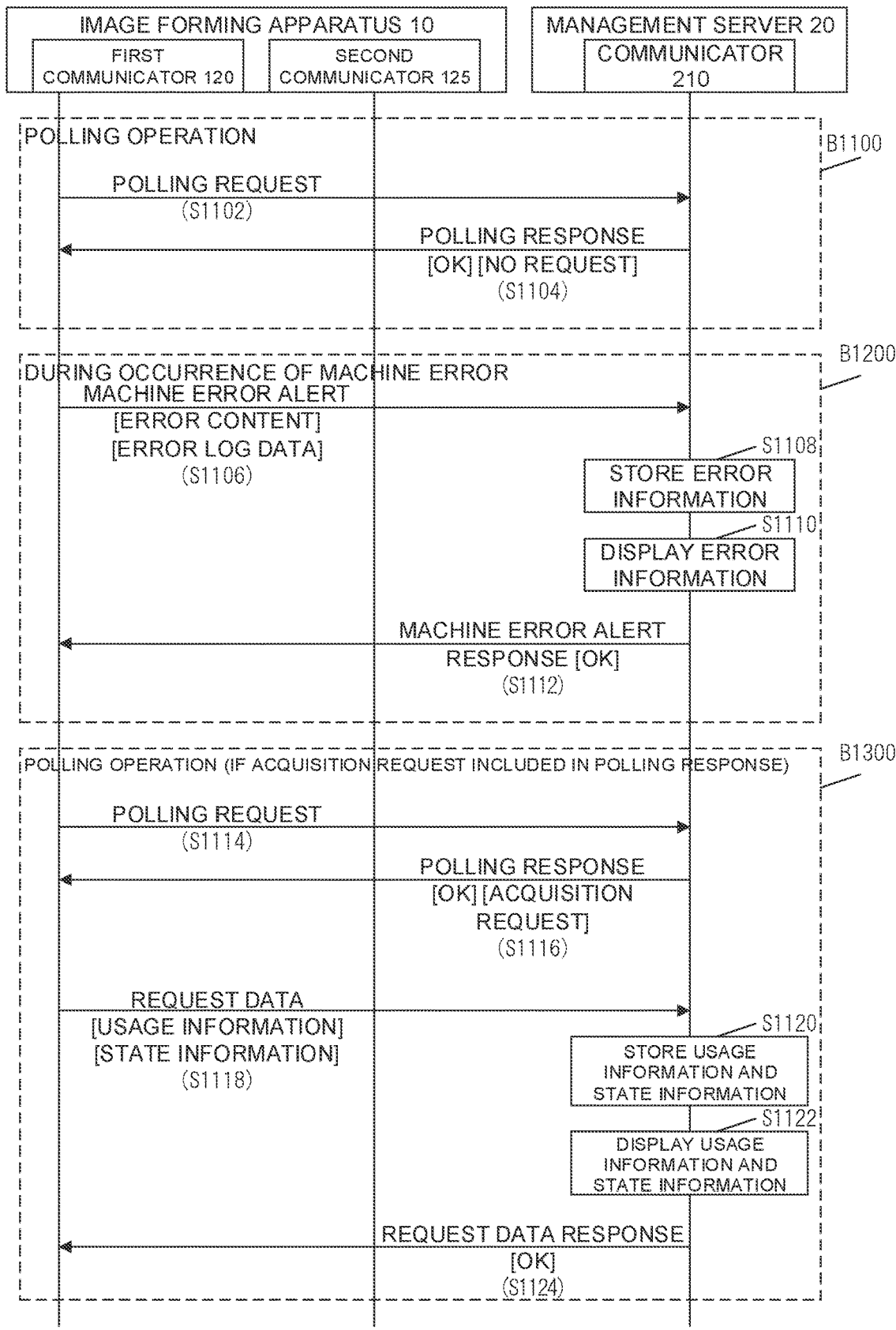
FIG. 9 is a sequence diagram illustrating an operation example according to the first embodiment.
Figure 10:
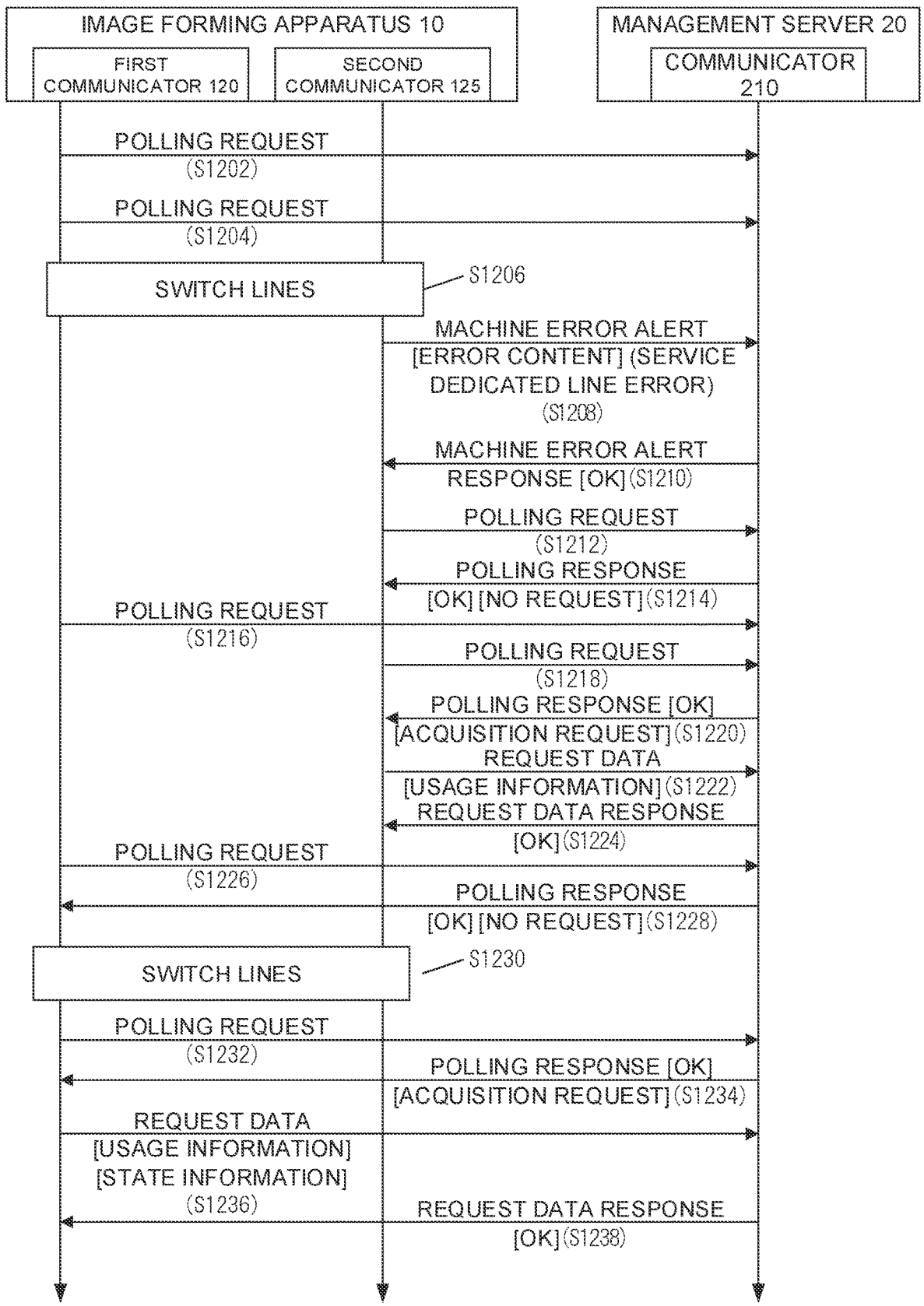
FIG. 10 is a sequence diagram illustrating an operation example according to the first embodiment.

In the present embodiment, a content communicated by the image forming apparatus 10 with the management server 20 using the service dedicated line and the user shared line will be described with reference to the drawings. FIGS. 9 and 10 are sequence diagrams illustrating a content of a communication performed by the image forming apparatus 10 with the management server 20 using the service dedicated line and the user shared line.

1. 4. 1 Process in Normal State

First, a process flow if no line error occurs in the service dedicated line will be described with reference to FIG. 9.

First, a polling operation (B1100) performed by the image forming apparatus 10 with respect to the management server 20 will be described.

Specifically, the command transmitter and receiver 106 of the image forming apparatus 10 transmits the polling request generated by the data generation processor 110 to the management server 20 via the first communicator 120 (S1102). The command transmitter and receiver 202 of the management server 20 analyzes the received polling request and notifies the data generation processor 204 of the polling request. The data generation processor 204 that receives the notification generates a command of a polling response. Then, the command transmitter and receiver 202 transmits the polling response generated by the data generation processor 204 to the image forming apparatus 10 via the communicator 210 (S1104).

The polling request is correctly received through the service dedicated line, and thus, the data generation processor 204 may generate a command of a polling response by including "OK" as a parameter. At this point, there is no data to be requested from the image forming apparatus 10, and thus, the management server 20 may include only "OK" as a parameter or may include a parameter indicating "no request."

As described above, the polling request and the polling response are transmitted between the image forming apparatus 10 and the management server 20 via the service dedicated line.

Next, an operation when a machine error occurs in the image forming apparatus 10 will be described (B1200).

If an error occurs in the image forming apparatus 10, the event reception processor 108 detects the error and transmits a notification to each of the functional elements. Based on the notification from the event reception processor 108, the data generation processor 110 collects data such as an error content (date and time of error occurrence and error type)

and error log data, as information about the error. Then, the data generation processor 110 generates a command of a machine error alert including the collected data.

The command transmitter and receiver 106 transmits a machine error alert to the management server 20 via the first communicator 120 (S1106).

The command transmitter and receiver 202 of the management server 20 receives the machine error alert from the image forming apparatus 10 via the communicator 210. The command transmitter and receiver 202 of the management server 20 analyzes a content of the command. Based on an analysis result of the command transmitter and receiver 202, the controller 200 stores, as error information, the error content and the error log data in the error information storage area 246, and displays the error information (for example, the error type) on the display 220 (S1108→S1110).

In the management server 20, the data generation processor 204 generates a command of a machine error alert response. Then, the command transmitter and receiver 202 transmits the machine error alert response generated by the data generation processor 204 to the image forming apparatus 10 (S1112). The data generation processor 204 may include "OK" indicating that a process is normally performed, in a parameter of the machine error alert response.

As described above, the machine error alert and the machine error alert response if a machine error occurs are transmitted and received by communication between the image forming apparatus 10 and the management server 20 via the service dedicated line.

Next, an operation (B1300) in a case where the management server 20 includes an acquisition request in a parameter of the polling response will be described.

Specifically, the command transmitter and receiver 106 of the image forming apparatus 10 transmits the polling request generated by the data generation processor 110 to the management server 20 via the first communicator 120 (S1114). The command transmitter and receiver 202 of the management server 20 analyzes the received polling request and notifies the data generation processor 204 of the polling request.

The data generation processor 204 that receives the notification generates a command of a polling response. At this time, the data generation processor 204 includes an "acquisition request" as a parameter in the polling response. Then, the command transmitter and receiver 202 transmits the polling response generated by the data generation processor 204 to the image forming apparatus 10 via the communicator 210 (S1116).

If the command transmitter and receiver 106 of the image forming apparatus 10 analyzes the polling response and determines that the "acquisition request" is included as a parameter, the command transmitter and receiver 106 notifies the data generation processor 110 of reception of the acquisition request from the management server 20. The data generation processor 110 reads the usage information storage area 182 and the state information storage area 184, and generates request data including the usage information and the state information. Then, the command transmitter and receiver 106 transmits the generated request data via the first communicator 120 (S1118).

The command transmitter and receiver 202 analyzes the request data received from the image forming apparatus 10 and extracts the usage information and the state information. The controller 200 stores the extracted usage information in the usage information storage area 242 and stores the extracted state information in the state information storage area 244 (S1120). Then, the controller 200 displays the usage information and the state information included in the request data (S1122).

The command transmitter and receiver 202 notifies the data generation processor 204 of reception of the request data. The data generation processor 204 that receives the notification generates a command of a request data response. Then, the command transmitter and receiver 202 transmits the request data response generated by the data generation processor 204 to the image forming apparatus 10 via the communicator 210 (S1124).

As described above, the request data and the request data response are transmitted and received by communication between the image forming apparatus 10 and the management server 20 via the service dedicated line.

1. 4. 2 During Occurrence of Line Error

Next, an operation if a line error occurs in the service dedicated line will be described with reference to FIG. 10.

First, the data generation processor 110 of the image forming apparatus 10 generates a command of a polling request. Then, the command transmitter and receiver 106 transmits the polling request to the management server 20 via the first communicator 120 (S1202 in FIG. 10).

Here, if a reception of a response from the management server 20 times out or a polling response including a piece of information "NG" is acquired, the command transmitter and receiver 106 transmits the polling request again via the first communicator 120 (S1204).

That is, the polling response is not received in S1202, and thus, the line error determiner 102 determines whether the service dedicated line is currently in a normal state or experiences an error. Thus, the command transmitter and receiver 106 repeatedly transmits the polling request until a value is equal to or greater than a determination value.

If an error occurs in the service dedicated line, the line error determiner 102 determines that an error occurs in the service dedicated line. Then, the line selector 104 switches a communicator that communicates with the management server 20 from the first communicator 120 to the second communicator 125. That is, as a communication line for performing communication between the image forming apparatus 10 and the management server 20, the user shared line is selected rather than the service dedicated line (S1206 in FIG. 10/step S132 in FIG. 4; Yes→step S134).

It is noted that the command transmitter and receiver 106 of the image forming apparatus 10 periodically transmits the polling request to the management server 20 via the first communicator 120 at constant intervals (for example, S1216 and S1226). This is because the line error determiner 102 determines that the error in the service dedicated line is resolved.

If receiving a notification about a failure occurring in the first communicator 120, the event reception processor 108 notifies each of the functional elements about the failure. Based on the notification from the event reception processor 108, the data generation processor 110 that receives the notification collects information regarding the error and generates a command of a machine error alert.

The command transmitter and receiver 106 transmits the machine error alert to the management server 20. However, in S1206, the communicator that communicates with the management server 20 is switched to the second communicator 125, and thus, the command transmitter and receiver 106 selects data to be transmitted to the management server 20. Specifically, the command transmitter and receiver 106 limits data to be included in the machine error alert to the error content, and then transmits the machine error alert to the management server 20 (S1208). Thus, the error content is transmitted to the management server 20, but the error log data is not transmitted.

The command transmitter and receiver 202 of the management server 20 analyzes the received machine error alert and notifies the data generation processor 204 of the machine error alert. The data generation processor 204 that receives the notification generates a command of a machine error alert response. Then, the command transmitter and receiver 202 transmits the generated command of the error alert response to the image forming apparatus 10 (S1210). The controller 200 stores and displays the error content received from the image forming apparatus 10.

The command transmitter and receiver 106 of the image forming apparatus 10 transmits a polling request (S1212) and receives a polling response (S1214) via the second communicator 125.

If transmitting a polling request (S1218) and receiving a polling response including a parameter of an acquisition request (S1220), the command transmitter and receiver 106 transmits request data via the second communicator 125 (S1222). In this case, the communicator that communicates with the management server 20 is switched to the second communicator 125, and thus, the command transmitter and receiver 106 selects data to be transmitted to the management server 20 and limits data to be transmitted. Specifically, the command transmitter and receiver 106 of the image forming apparatus 10 sets data to be included in the request data to the usage information and then transmits the request data to the management server 20. The command transmitter and receiver 106 of the image forming apparatus 10 receives a request data response via the second communicator 125 (S1224).

Here, if the line error determiner 102 transmits a polling request via the first communicator 120 (S1226), a polling response may be received from the management server 20 (S1228). In such a case, the line selector 104 switches the communicator that communicates with the management server 20 from the second communicator 125 to the first communicator 120. That is, as the communication line for performing communication between the image forming apparatus 10 and the management server 20, the service dedicated line is selected rather than the user shared line (S1230 in FIG. 10/step S132 in FIG. 4; No→step S136).

After the communicator that communicates with the management server 20 is switched to the first communicator 120, the command transmitter and receiver 106 transmits a polling request to the management server 20 via the first communicator 120 (S1232). If receiving a polling response including a parameter of an acquisition request (S1234), the command transmitter and receiver 106 transmits request data to the management server 20 via the first communicator 120 (S1236). It is noted that the communication with the management server 20 is performed via the first communicator 120, and thus, the command transmitter and receiver 106 does not select data to be included in the request data. The command transmitter and receiver 106 receives a request data response from the management server 20 via the first communicator 120 (S1238).

According to the present embodiment, even if an abnormality such as a line error occurs in a line (service dedicated line) connecting the image forming apparatus 10 and the management server 20, the communication with the management server 20 is performed by switching to another line (user shared line). Thus, it is possible to prevent an interruption of the communication between the image forming apparatus 10 and the management server 20.

If the user shared line is used to perform communication between the image forming apparatus 10 and the management server 20, a data amount to be communicated by using the user shared line used by the user is suppressed by limiting a communication amount and data to be communicated. Thus, it is possible for the image forming apparatus 10 to perform necessary communication with the management server 20.

Even after the abnormality occurs in the service dedicated line, the image forming apparatus 10 communicates with the management server 20 by using the service dedicated line at constant intervals to determine a state of the service dedicated line. Thus, if the service dedicated line is restored, the image forming apparatus 10 automatically switches the communication with the management server 20 to the communication using the service dedicated line without using the user shared line.

2. Second Embodiment

Next, a second embodiment will be described. Unlike the first embodiment, in the second embodiment, if the image forming apparatus 10 does not normally transmit a machine error alert to the management server 20, a line to be used is switched and then a machine error alert is transmitted. That is, in the first embodiment, if an error occurs in the service dedicated line when the machine error alert is transmitted in step S102 of the line error determination process, the line error determination process ends without the machine error alert being transmitted. Thus, a content of the error that occurs in the image forming apparatus 10 is not transmitted to the management server 20. The present embodiment appropriately deals with such a case. In the present embodiment, FIG. 6 of the first embodiment is replaced with FIG. 11. It is noted that the same numeral or symbol is attached to the same functional element and process, and description of the duplicated part is omitted.

Figure 11:
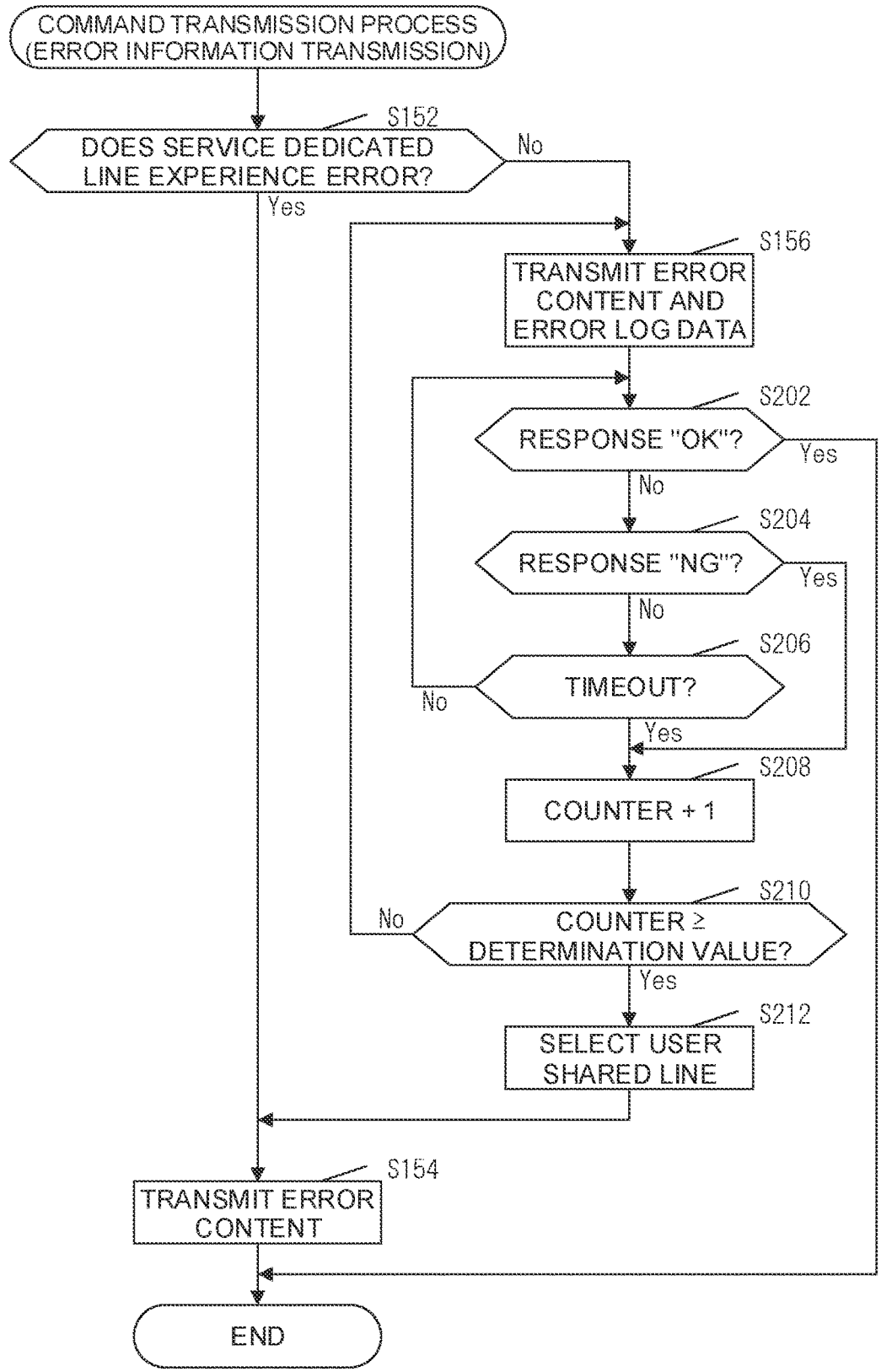
FIG. 11 is a flowchart for describing a flow of a command transmission process (error information transmission) according to a second embodiment.

A command transmission process for transmitting error information according to the present embodiment will be described with reference to FIG. 11. First, if the service dedicated line is in a normal state (if no error occurs), the command transmitter and receiver 106 transmits the error content (first information) and the error log data (second information) to the management server 20 (step S152; No→step S156).

At this time, if OK is not received as a response from the management server 20, the command transmitter and receiver 106 determines whether NG is received as a response from the management server 20 (step S202; No→step S204). If NG is not received as a response, the command transmitter and receiver 106 determines whether a response is not received due to a timeout (step S204; No→step S206). If NG is received as a response from the management server 20 (step S204; Yes) or a response is not received due to the timeout (step S206; Yes), the command transmitter and receiver 106 adds 1 to the value of the counter (step S208).

The command transmitter and receiver 106 determines whether the value of the counter is equal to or greater than the determination value (for example, "5") (step S210). If the value of the counter is not equal to or greater than the determination value (step S210; No), the error content and the error log data are again transmitted through the service dedicated line (step S156).

On the other hand, if the value of the counter is equal to or greater than the determination value in step S210 (step S210; Yes), the command transmitter and receiver 106 switches the communicator used for communication with the management server 20 to the second communicator 125. That is, the command transmitter and receiver 106 selects the user shared line as a line for transmitting and receiving data (step S212). Then, if the service dedicated line experiences an error, the command transmitter and receiver 106 transmits only the error content (first information) to the management server 20 (step S154).

Figure 12:
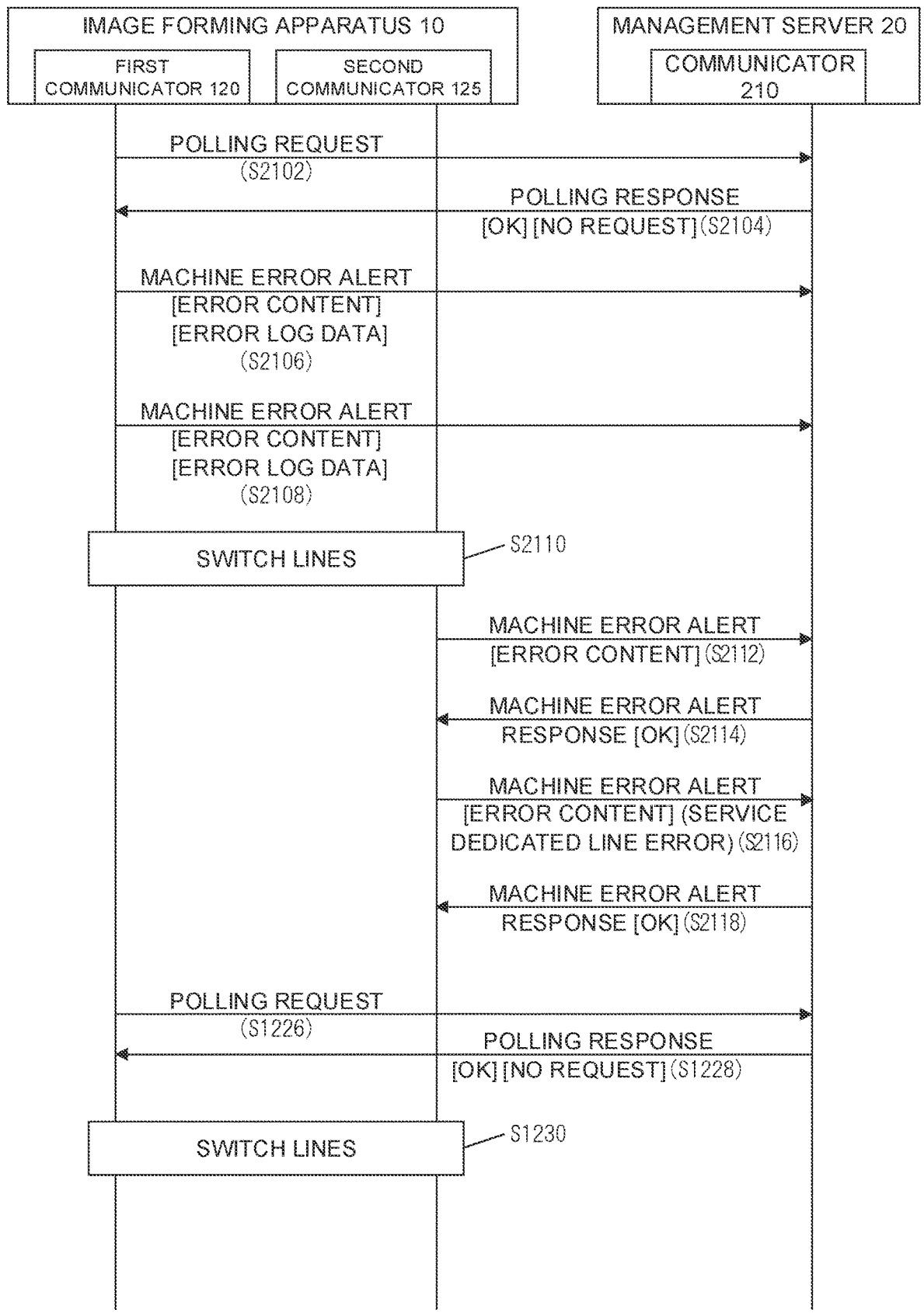
FIG. 12 is a sequence diagram illustrating an operation example according to the second embodiment.

An operation example of the present embodiment will be described with reference to FIG. 12. First, the command transmitter and receiver 106 transmits a polling request to the management server 20 via the first communicator 120 (S2102). The command transmitter and receiver 106 receives a polling response transmitted from the management server 20 via the first communicator 120 (S2104).

If an error occurs in the image forming apparatus 10, the command transmitter and receiver 106 transmits a machine error alert including the error content and the error log data to the management server 20 via the first communicator 120 (S2106). At this time, if the transmission is not performed normally, the command transmitter and receiver 106 repeatedly transmits the machine error alert (S2108).

If the transmission of the machine error alert is not performed normally even when the machine error alert is transmitted a predetermined number of times of a determination value, the command transmitter and receiver 106 switches the communicator that communicates with the management server 20 from the first communicator 120 to the second communicator 125 (S2110).

The command transmitter and receiver 106 transmits the machine error alert including the error content not transmitted in S2106 to the management server 20 via the second communicator 125 (S2112). Upon receiving a machine error alert response from the management server 20 (S2114), the command transmitter and receiver 106 transmits a machine error alert in which the error content indicates a service dedicated line error to the management server 20 via the second communicator 125 (S2116). The command transmitter and receiver 106 again receives a machine error alert response from the management server 20 (S2118).

The subsequent process is the same as S1208 of the first embodiment. That is, after switching the communicator that communicates with the management server 20 to the second communicator 125, the image forming apparatus 10 communicates with the management server 20 via the second communicator 125. The command transmitter and receiver 106 of the image forming apparatus 10 periodically transmits a polling request to the management server 20 via the first communicator 120 at constant intervals (S1226). At this time, if a polling response is received from the management server 20 (S1228), the line selector 104 switches the communicator that communicates with the management server 20 from the second communicator 125 to the first communicator 120 (S1230).

According to the present embodiment, if the machine error alert is not normally transmitted from the image forming apparatus 10 to the management server 20, the machine error alert is transmitted by using the user shared line.

3. Third Embodiment

Next, a third embodiment will be described. Unlike the first embodiment, in the third embodiment, if the image forming apparatus 10 does not normally transmit request data to the management server 20, a line to be used is switched and then the request data is transmitted. The present embodiment appropriately deals with a case where an error occurs in the service dedicated line when request data is transmitted in S102 of the line error determination process. In the present embodiment, FIG. 5 of the first embodiment is replaced with FIG. 13. It is noted that the same numeral or symbol is attached to the same functional element and process, and description of the duplicated part is omitted.

Figure 13:
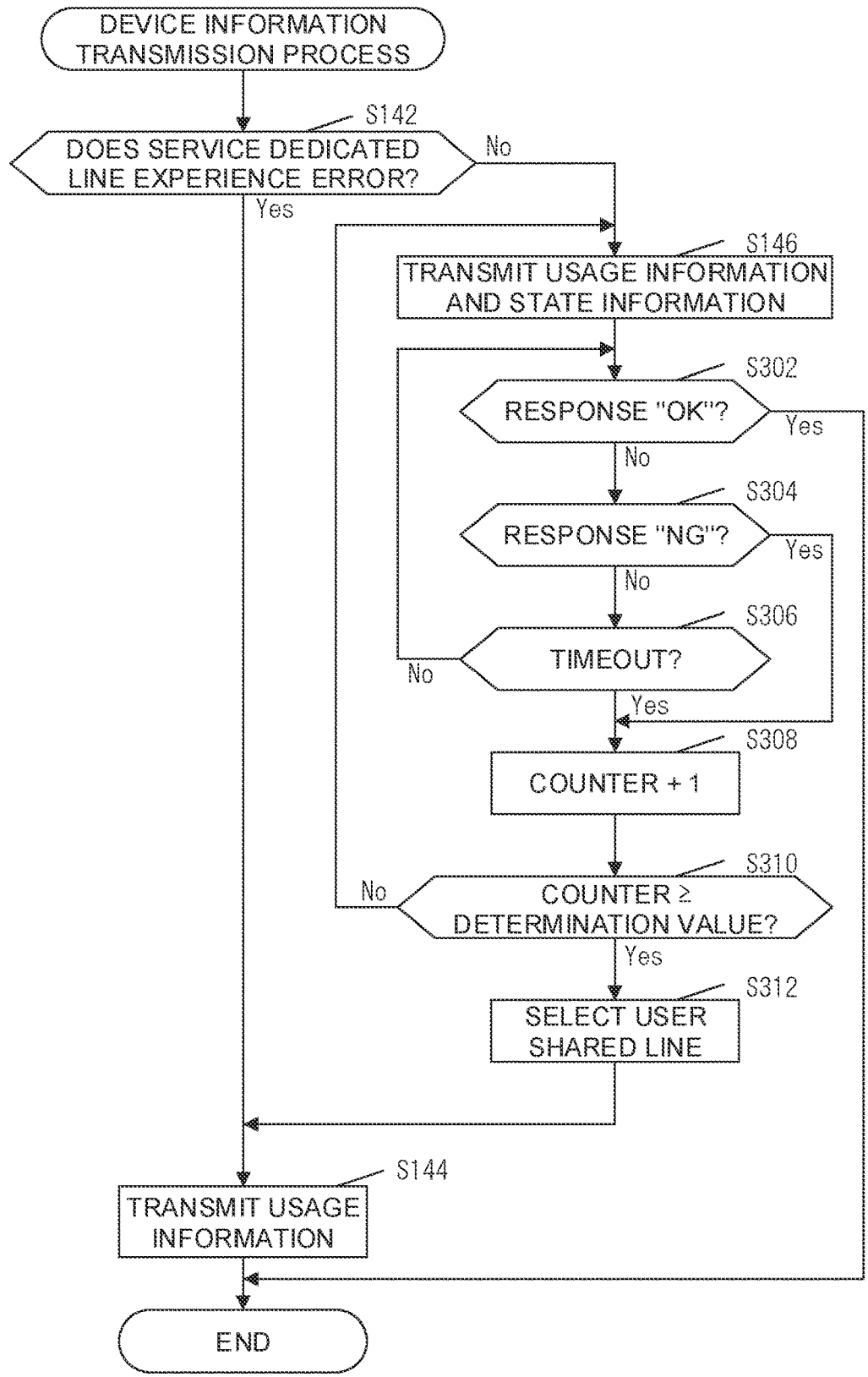
FIG. 13 is a flowchart for describing a flow of a command transmission process (request data transmission) according to a third embodiment.

A command transmission process for transmitting request data according to the present embodiment will be described with reference to FIG. 13. First, if the service dedicated line is in a normal state (if no error occurs), the command transmitter and receiver 106 transmits usage information and state information to the management server 20 (step S142; No→step S146).

If OK is not received as a response from the management server 20, the command transmitter and receiver 106 determines whether NG is received as a response from the management server 20 (step S302; No→step S304), and whether a response is not received due to a timeout (step S304; No→step S306). If NG is received as a response from the management server 20 (step S304; Yes) or if a response is not received due to the timeout (step S306; Yes), the command transmitter and receiver 106 adds 1 to the value of the counter (step S308).

The command transmitter and receiver 106 determines whether the value of the counter is equal to or greater than the determination value (for example, "5") (step S310). If the value of the counter is not equal to or greater than the determination value (step S310; No), the command transmitter and receiver 106 transmits the usage information and the state information again through the service dedicated line (step S146).

On the other hand, if the value of the counter is equal to or greater than the determination value in step S310 (step S310; Yes), the command transmitter and receiver 106 switches the communicator used for communication with the management server 20 to the second communicator 125. That is, the command transmitter and receiver 106 selects the user shared line as a line for transmitting and receiving data (step S312). Then, the command transmitter and receiver 106 transmits only the usage information (first information) to the management server 20 (step S144).

Figure 14:
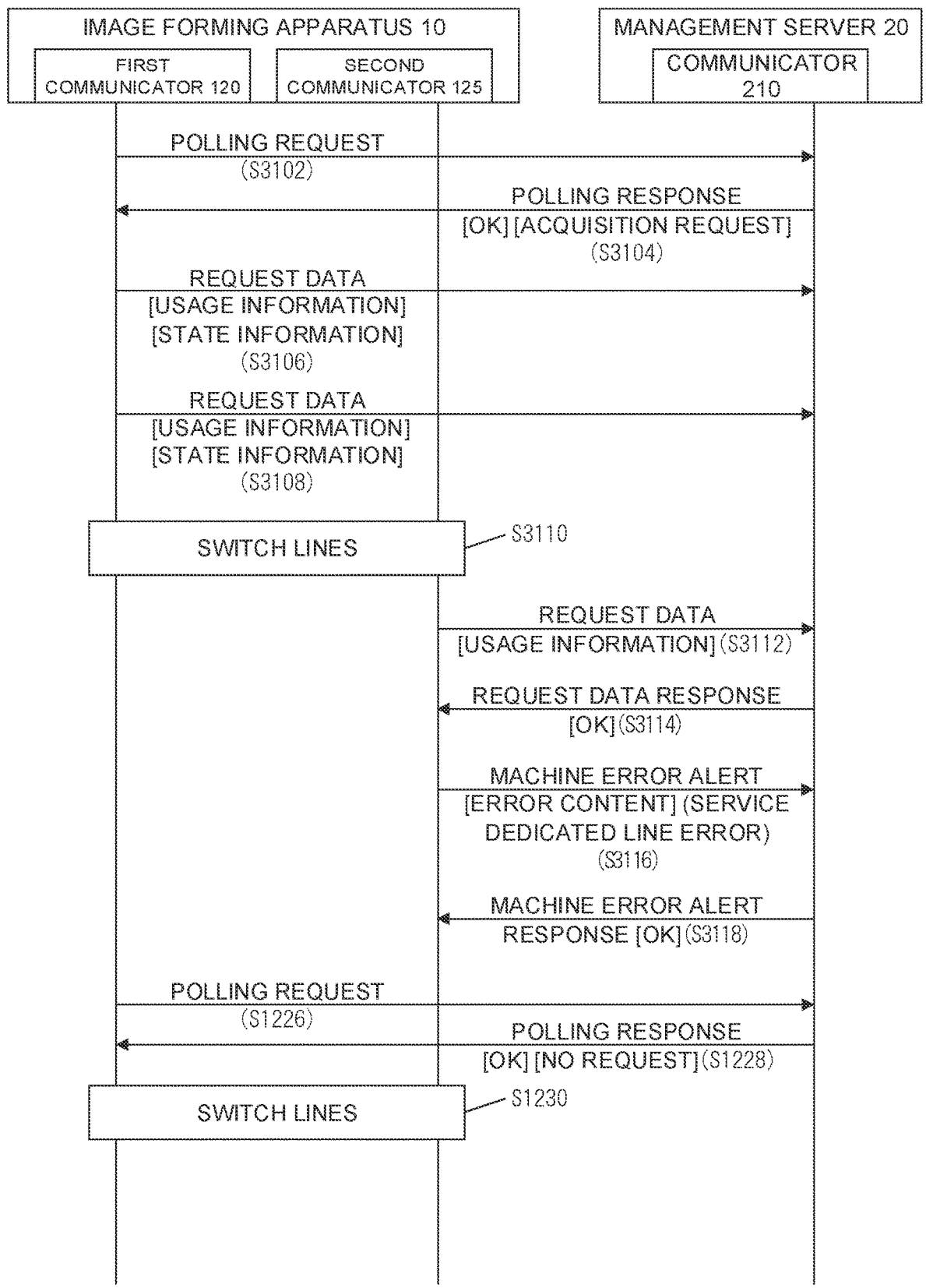
FIG. 14 is a sequence diagram illustrating an operation example according to the third embodiment.

An operation example of the present embodiment will be described with reference to FIG. 14. First, the command transmitter and receiver 106 transmits a polling request to the management server 20 via the first communicator 120 (S3102). The command transmitter and receiver 106 receives a polling response transmitted from the management server 20 via the first communicator 120 (S3104).

If an acquisition request is included in the polling response, the command transmitter and receiver 106 transmits request data including usage information and state information to the management server 20 via the first communicator 120 (S3106). At this time, if the transmission is not performed normally, the command transmitter and receiver 106 repeatedly transmits the request data (S3108).

If the transmission of the request data is not normally performed even when the request data is transmitted a predetermined number of times of the determination value, the command transmitter and receiver 106 switches the communicator that communicates with the management server 20 from the first communicator 120 to the second communicator 125 (S3110).

The command transmitter and receiver 106 transmits the request data including the usage information not transmitted in S3106 to the management server 20 via the second communicator 125 (S3112). Upon receiving a request data response from the management server 20 (S3114), the command transmitter and receiver 106 transmits a machine error alert in which the error content indicates a service dedicated line error to the management server 20 via the second communicator 125 (S3116). The command transmitter and receiver 106 receives a machine error alert response from the management server 20 (S3118).

The subsequent process is the same as S1208 of the first embodiment. That is, after switching the communicator that communicates with the management server 20 to the second communicator 125, the image forming apparatus 10 communicates with the management server 20 via the second communicator 125. The command transmitter and receiver 106 of the image forming apparatus 10 periodically transmits a polling request to the management server 20 via the first communicator 120 at constant intervals (S1226). At this time, if a polling response is received from the management server 20 (S1228), the line selector 104 switches the communicator that communicates with the management server 20 from the second communicator 125 to the first communicator 120 (S1230).

According to the present embodiment, if the request data is not normally transmitted from the image forming apparatus 10 to the management server 20, the request data is transmitted by using the user shared line.

4. Modification

The present invention is not limited to the above embodiments, and can have various modifications. That is, embodiments obtained by combining technical means appropriately changed within the scope not departing from the gist of the present invention are also included in the technical scope of the present invention.

Further, although the above-described embodiments have portions described separately for convenience of description, it is needless to say that the embodiments may be combined and executed within a technically possible range.

In addition, a program operating in each of the devices in the embodiments is a program (a program for making a computer function) that controls a CPU and the like to realize the functions of the above-described embodiments. Information processed by these devices is temporarily stored in a temporary storage device (such as a RAM) at the time of processing the information, and then stored in storage devices such as various types of Read Only Memories (ROMs) and HDDs, and read, or corrected/written by the CPU as necessary.

Here, examples of a storage medium for storing the program may include a semiconductor medium (such as a ROM and a non-volatile memory card), an optical storage medium/magneto-optical storage medium (such as a Digital Versatile Disc (DVD), a Magneto Optical Disc (MO), a Mini Disc (MD), a Compact Disc (CD), and a Blu-ray Disc (BD) (registered trademark)), and a magnetic storage medium (such as magnetic tape and a flexible disk). In addition to a case where the functions of the above-described embodiments are realized by executing the loaded program, there may be a case where the functions of the present invention are realized as a result of processing that is based on the instructions of the program and performed in cooperation with an operating system, another application program, or the like.

In addition, if the program is distributed to a market, the program may be stored in a portable storage medium to be distributed, or the program may be transferred to a server computer connected via a network such as the Internet. In this case, of course, a storage device of the server computer is also included in the present invention.

DESCRIPTION OF REFERENCE NUMERALS

1 System
10 Image forming apparatus
100 Controller
102 Line error determiner
104 Line selector
106 Command transmitter and receiver
108 Event reception processor
110 Data generation processor
120 First communicator
125 Second communicator
130 Image reader
135 Image processor
140 Image former
150 Display
160 Operation inputter
170 Sensor device
180 Storage
182 Usage information storage area
184 State information storage area
186 Setting information storage area
188 Image data storage area
20 Management server
200 Controller
210 Communicator
220 Display
230 Operation inputter
240 Storage
242 Usage information storage area
244 State information storage area
246 Error information storage area
248 Image forming apparatus management table

What is claimed is:

1. An image forming apparatus, comprising:
a controller; and
an image former, wherein
the controller is configured to:
  select one of a plurality of communication methods and communicate with an external device via the selected communication method;
  control the image former to form an image;
the controller performs control to
  transmit usage information of the image forming apparatus or state information of the image forming apparatus to the external device via a first communication method selected by the controller; and
  when a problem occurs in the first communication method:
  select a second communication method different from the first communication method, and
  transmit the usage information of the image forming apparatus or the state information of the image forming apparatus to the external device via the second communication method.

2. The image forming apparatus according to claim 1, wherein the controller is further configured to select the second communication method to communicate with a terminal device used by a user.

3. The image forming apparatus according to claim 1, wherein the usage information includes count data indicating a number of images formed by the image former.

4. The image forming apparatus according to claim 1, wherein, if the usage information of the image forming apparatus and the state information of the image forming apparatus are not transmitted to the external device within a predetermined time, the controller is further configured to determine that the problem has occurred in the first communication method.

5. The image forming apparatus according to claim 1, wherein, after the problem has occurred in the first communication method, the controller is further configured to determine at constant intervals whether the problem in the first communication method is resolved.

6. The image forming apparatus according to claim 1, wherein, when the problem occurs in the first communication method and the controller selects the second communication method, the controller is further configured to transmit the usage information of the image forming apparatus to the external device.

7. The image forming apparatus according to claim 1, wherein a data amount of the usage information is smaller than a data amount of the state information.

8. The image forming apparatus according to claim 1, wherein, when the problem occurs in the first communication method, the controller is further configured to select the second communication method to transmit a command and data or a polling request to the external device.

9. An image forming apparatus, comprising:
a controller; and
an image former, wherein
the controller is configured to:
  select one of a plurality of communication methods and communicate with an external device via the selected communication method;
  control the image former to form an image;
  the controller performs control to
  transmit an error content of the image forming apparatus or error log data of the image forming apparatus to the external device via a first communication method selected by the controller; and
  when a problem occurs in the first communication method:
  select a second communication method different from the first communication method, and
  transmit the error content of the image forming apparatus or the error log data of the image forming apparatus to the external device via the second communication method if a problem occurs in the first communication method, the second communication method being selected by the controller and being different from the first communication method.

10. A control method for an image forming apparatus, the control method comprising:
selecting one of a plurality of communication methods and communicating with an external device via the selected communication method;
controlling an image former of the image forming apparatus to form an image;
transmitting usage information of the image forming apparatus or state information of the image forming apparatus to the external device via a first communication method selected by the controller; and
when a problem occurs in the first communication method:
selecting a second communication method different from the first communication method, and
transmitting the usage information of the image forming apparatus or the state information of the image forming apparatus to the external device via the second communication method.

11. A control method for an image forming apparatus, the control method comprising:
selecting one of a plurality of communication methods and communicating with an external device via the selected communication method;
controlling an image former to form an image;
the control method comprises:
transmitting an error content of the image forming apparatus or error log data of the image forming apparatus to the external device via a first communication method selected by the controller; and
when a problem occurs in the first communication method:
selecting a second communication method different from the first communication method, and
transmitting the error content of the image forming apparatus or the error log data of the image forming apparatus to the external device via the second communication method.

* * * * *